(12) United States Patent
Hsieh et al.

(10) Patent No.: US 11,770,642 B2
(45) Date of Patent: Sep. 26, 2023

(54) IMAGE SENSOR INTEGRATED WITH CONVOLUTIONAL NEURAL NETWORK COMPUTATION CIRCUIT

(71) Applicant: National Tsing Hua University, Hsinchu (TW)

(72) Inventors: Chih-Cheng Hsieh, Hsinchu (TW); Tzu-Hsiang Hsu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 90 days.

(21) Appl. No.: 17/690,012

(22) Filed: Mar. 9, 2022

(65) Prior Publication Data
US 2023/0188865 A1 Jun. 15, 2023

(30) Foreign Application Priority Data

Dec. 14, 2021 (TW) .................................. 110146670

(51) Int. Cl.
*H04N 25/78* (2023.01)
*H04N 19/124* (2014.01)
(Continued)

(52) U.S. Cl.
CPC ........... *H04N 25/78* (2023.01); *H04N 19/124* (2014.11); *H04N 23/611* (2023.01); *H04N 23/617* (2023.01); *H04N 23/80* (2023.01)

(58) Field of Classification Search
CPC .... H04N 25/40; H04N 19/124; H04N 25/709; H04N 25/75; H04N 25/77; H04N 23/61; H04N 23/611; H04N 23/617; H04N 25/78
(Continued)

(56) References Cited

U.S. PATENT DOCUMENTS

2020/0213587 A1* 7/2020 Galpin ................. H04N 19/117
2020/0234411 A1* 7/2020 Xu ........................... H04N 9/646
(Continued)

FOREIGN PATENT DOCUMENTS

CN 110929569 3/2020
CN 112819678 5/2021
(Continued)

OTHER PUBLICATIONS

Tzu-Hsiang Hsu; et al., "A 0.5-V Real-Time Computational CMOS Image Sensor With Programmable Kernel for Feature Extraction," IEEE Journal of Solid-State Circuits, vol. 56, No. 5, May 2021, pp. 1588-1596.
(Continued)

*Primary Examiner* — Lin Ye
*Assistant Examiner* — Chan T Nguyen
(74) *Attorney, Agent, or Firm* — JCIPRNET

(57) ABSTRACT

An image sensor integrated with a convolutional neural network computation circuit is provided. The image sensor includes: a pixel array including pixels divided into pixel groups, wherein each pixel converts a light signal into a PWM signal; a convolution computation circuit controlling a turn-on time of a corresponding weighted current according to the first PWM signal of each pixel, and accumulating the weighted currents into an integrated current; a comparison circuit converting the integrated current into a second PWM signal and comparing it with that of an adjacent pixel group to output a larger one; and a classification circuit quantizing the second PWM signal to a quantization value according to a weight of a node in a fully-connected layer corresponding to each pixel group, accumulating the quantization values of all pixel groups into a feature value, and comparing the feature value with a feature threshold to obtain a classification result.

10 Claims, 15 Drawing Sheets

(51) Int. Cl.
*H04N 23/611* (2023.01)
*H04N 23/617* (2023.01)
*H04N 23/80* (2023.01)

(58) Field of Classification Search
USPC .................................................... 348/222.1
See application file for complete search history.

(56) References Cited

U.S. PATENT DOCUMENTS

2021/0044811 A1* 2/2021 Hodgkinson ........ H04N 19/136
2021/0149274 A1 5/2021 Kang et al.
2023/0028426 A1* 1/2023 Nadeem ............... H04N 19/103

FOREIGN PATENT DOCUMENTS

TW 202101960 1/2021
TW 202105985 2/2021

OTHER PUBLICATIONS

Tzu-Hsiang Hsu; et al., "A 0.5V Real-Time Computational CMOS Image Sensor with Programmable Kernel for Always-On Feature Extraction," 2019 IEEE Asian Solid-State Circuits Conference (A-SSCC), Nov. 4-6, 2019, pp. 33-34.
Tzu-Hsiang Hsu; et al., "15.9 A 0.8V Intelligent Vision Sensor with Tiny Convolutional Neural Network and Programmable Weights Using Mixed-Mode Processing-in-Sensor Technique for Image Classification," 2022 International Solid-State Circuits Conference, Feb. 20-24, 2022, pp. 1-3.

* cited by examiner

IMAGE SENSOR INTEGRATED WITH CONVOLUTIONAL NEURAL NETWORK COMPUTATION CIRCUIT

CROSS-REFERENCE TO RELATED APPLICATION

This application claims the priority benefit of Taiwan application serial no. 110146670, filed on Dec. 14, 2021. The entirety of the above-mentioned patent application is hereby incorporated by reference herein and made a part of this specification.

BACKGROUND

Technical Field

The disclosure relates to an image sensor, and in particular to an image sensor integrated with a convolutional neural network computation circuit. Description of Related Art With advanced research and development of convolutional neural network (CNN), artificial intelligence (AI) has been successfully applied to various applications, such as image recognition and image classification. However, complex network training and computations require hardware resources such as a field-programmable gate array (FPGA), a central processing unit (CPU), a graphics processing unit (GPU), etc. to support a large amount of computing work. However, a large amount of data access and multiply-accumulate (MAC) computations in arithmetic algorithms cause considerable energy consumption and data transmission delays.

Therefore, power limitations, computing power, and local data storage are key challenges for introducing smart networks into Internet-of-things (IoT) devices.

SUMMARY

The disclosure proposes an image sensor integrated with convolutional neural network computation, which completes image sensing, convolutional neural network computations, and discrimination of faces or features in a single image sensing chip.

The disclosure provides an image sensor integrated with convolutional neural network computation, which includes a pixel array, a convolution computation circuit, a comparison circuit, and classification circuit. The pixel array includes a plurality of pixels divided into a plurality of pixel groups, and a light signal received by conversion of each of the pixels is a first pulse width modulation (PWM) signal. The convolution computation circuit controls a turn-on time of a corresponding weighted current according to a first pulse width modulation signal of each of the pixels in each of the pixel groups, and accumulates the weighted currents of the plurality of pixels into an integrated current; and a value of the weighted current corresponds to a weight of a node in a convolutional layer in a trained convolutional neural network. The comparison circuit converts the integrated current into a second pulse width modulation signal, and compares the second pulse width modulation signal with the second pulse width modulation signal of the adjacent pixel group in a row direction, and outputs the second pulse width modulation signal with a larger value. The classification circuit quantizes the second pulse width modulation signal of the pixel group into one of a plurality of quantization values according to a weight of a node in a fully-connected layer corresponding to each of the pixel groups in the trained convolutional neural network, and accumulates the quantization value of all the pixel groups into a feature value, and compares the feature value with a feature threshold to obtain a classification result.

To provide a further understanding of the above features and advantages of the disclosure, embodiments accompanied with drawings are described below in details.

DESCRIPTION OF THE EMBODIMENTS

The embodiment of the disclosure proposes a trained and verified convolutional neural network for computation and implementation, which may complete image sensing, convolutional neural network computations, and face or feature discrimination (applications such as face detection) in a single image sensing chip, and may also provide multi-mode output of the original image and the convolutional computation image. The embodiment of the disclosure uses the pulse width modulation (PWM) pixel as the photosensitive element, performs complete convolutional neural network computation in a vertical parallel circuit, and outputs the discrimination result of the face or features. In this way, problems of frame rate drop, power consumption increase, and slower discrimination speed caused by data computations that need to be transmitted between chips may be solved.

Figure 1:
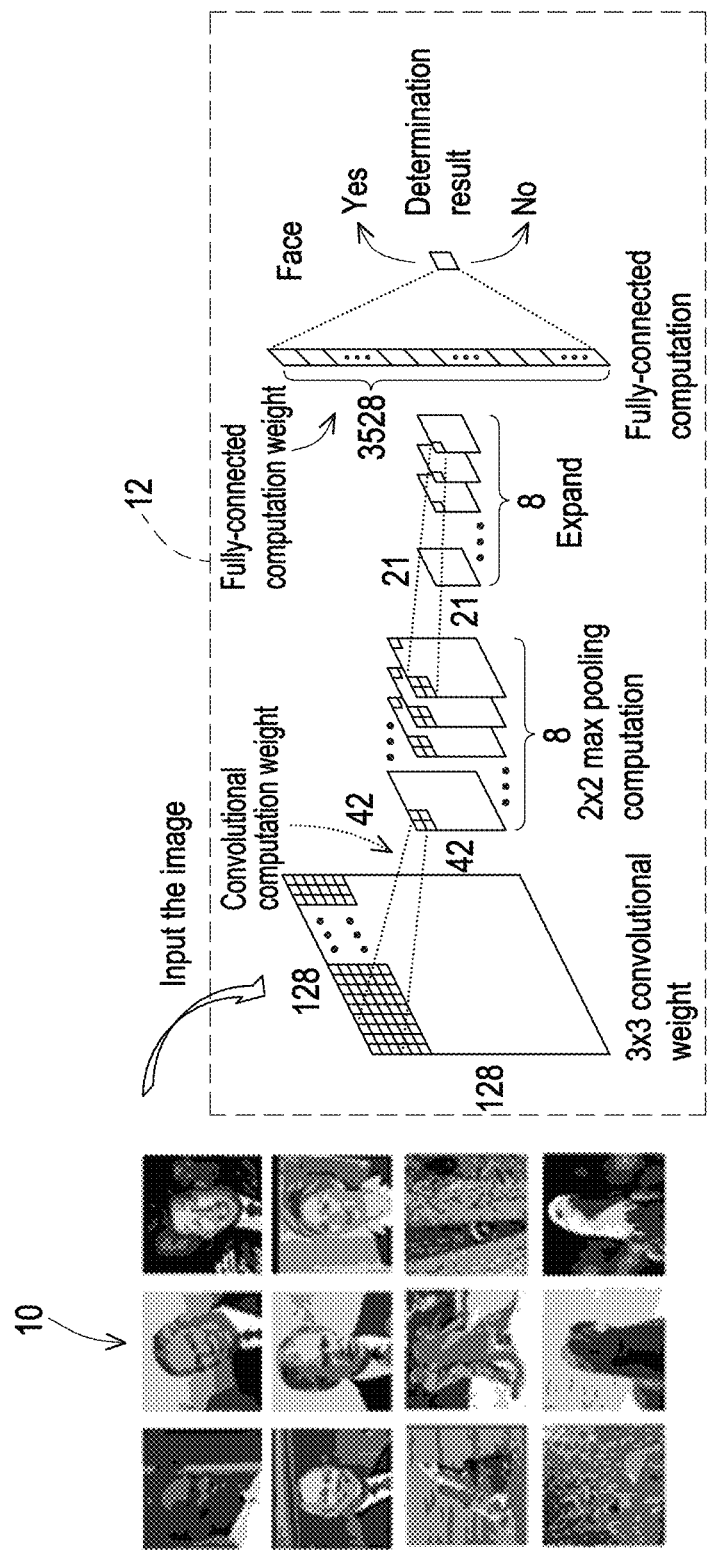
FIG. 1 illustrates a schematic diagram of an execution concept according to an embodiment of the disclosure.

FIG. 1 illustrates a schematic diagram of an execution concept according to an embodiment of the disclosure. Referring to FIG. 1, this embodiment uses a feature image dataset 10 to be distinguished, such as a face image and a non-face image, to train and verify (including 3×3 convolutional computation, 2×2 max pooling computation, fully-connected computation, etc.) a convolutional neural network 12, so as to generate a convolutional computation weight and a fully-connected computation weight, and create the customized convolutional neural network 12. The weight and computation of the convolutional neural network 12 may be implemented in the following image sensor, so that it may independently perform image shooting and facial feature discrimination.

Figure 2:
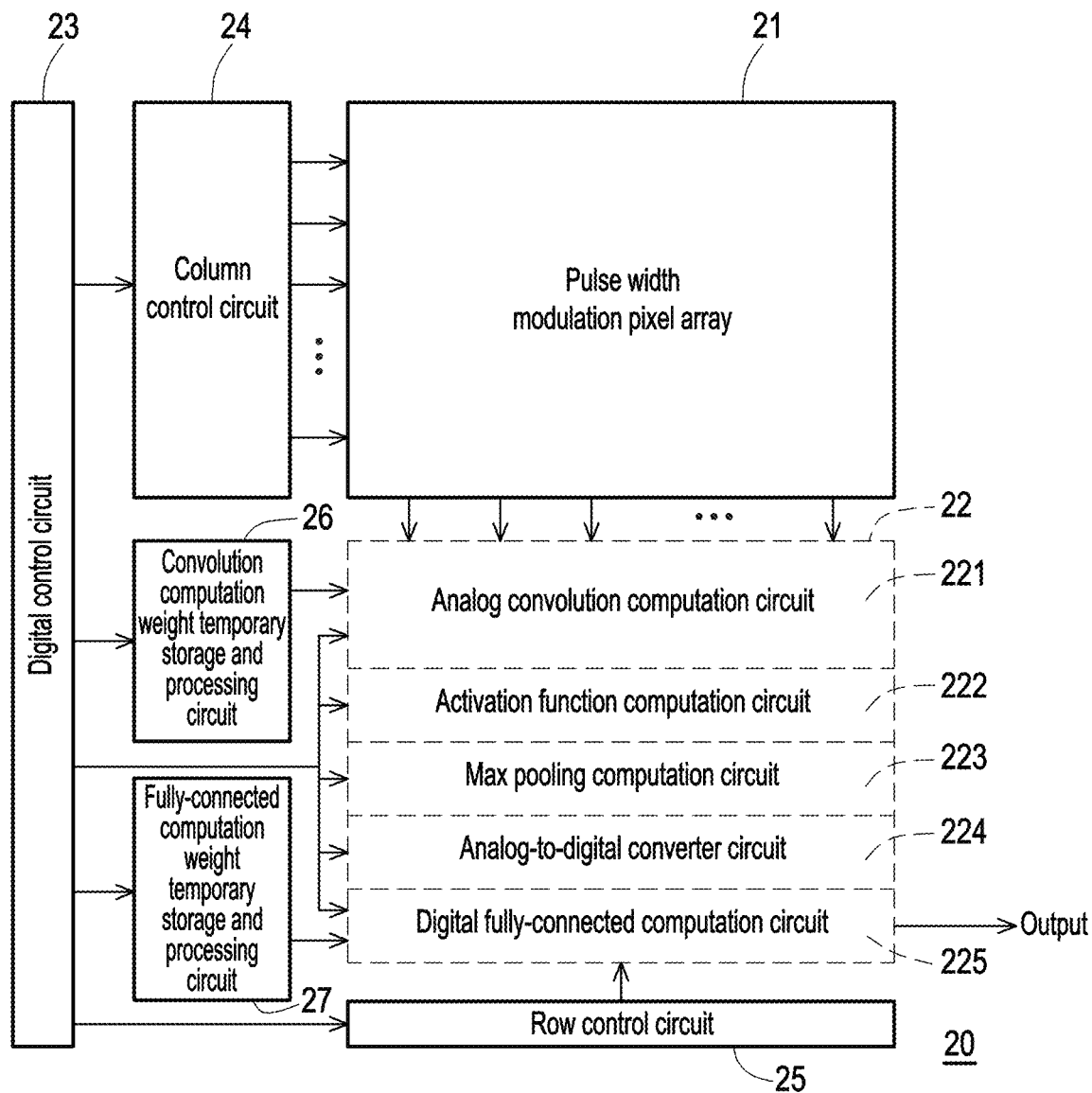
FIG. 2 illustrates a structural diagram of an image sensor integrated with convolutional neural network computation according to an embodiment of the disclosure.

FIG. 2 illustrates a structural diagram of an image sensor integrated with convolutional neural network computation according to an embodiment of the disclosure. Referring to FIG. 2, an image sensor 20 of this embodiment, for example, integrates image sensing, convolutional neural network computations, and feature discrimination on a single image sensing chip, which mainly includes a pulse width modulation pixel array (hereinafter referred to as pixel array) 21, a computation circuit 22 in a longitudinal parallel sensor, and a peripheral control circuit (including a digital control circuit 23, a row control circuit 24, a column control circuit 25, a convolution computation weight temporary storage and processing circuit 26, and a fully-connected computation weight temporary storage and processing circuit 27, etc.). The pixel array 21 has, for example, 128×128 pixels, and is responsible for sensing the environment image and capturing the light signal. The computation circuit 22 in a sensor may realize a complete convolutional neural network, including, for example, a 3×3 analog convolution computation circuit (hereinafter referred to as convolution computation circuit) 221 with a stride of 3, a computation circuit 222 performing the linear rectification activation function (ReLU), a 2×2 max pooling computation circuit (that is, comparison circuit) 223 with a stride of 2, an analog-to-digital converter circuit 224, and a digital fully-connected computation circuit (that is, classification circuit) 225.

Figure 3:
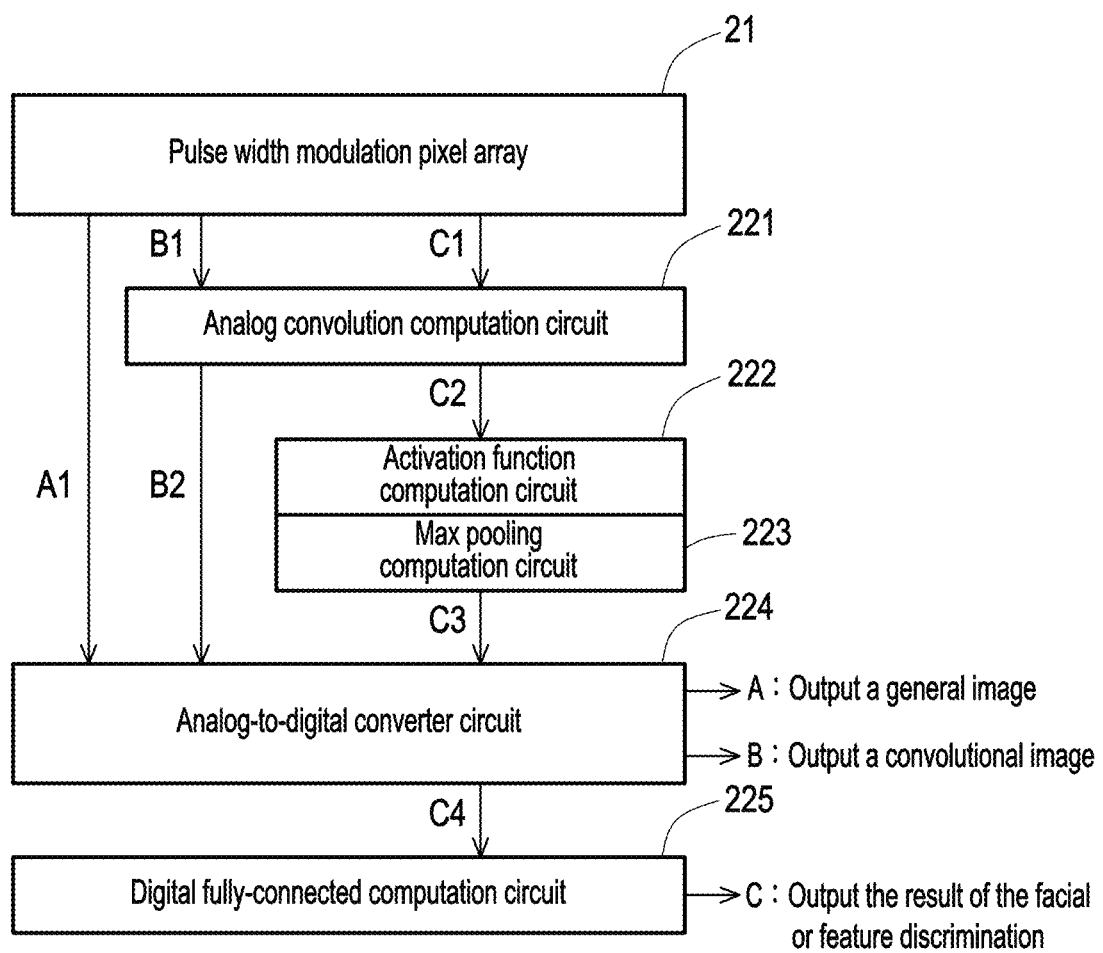
FIG. 3 illustrates a flow chart of an image sensor 20 operating in different modes according to an embodiment of the disclosure.

FIG. 3 illustrates a flow chart of the image sensor 20 operating in different modes according to an embodiment of the disclosure. Referring to FIG. 3, the pixel array data output by the pixel array 21 are output by the analog-to-digital converter circuit 224 through the A process (including the step A1) to output a general image. In a process B (including steps B1 and B2), the convolutional computation image is output through the analog convolution computation circuit 221 and the analog-to-digital converter circuit 224. In a C process (including steps C1, C2, C3, and C4) a complete convolutional neural network may be completed, and the result of the facial or feature discrimination may be output.

In an embodiment, the image sensor 20 mainly includes the pixel array 21, the convolution computation circuit 221, the max pooling computation circuit 223, and the fully-connected computation circuit 224. The pixel array 21 includes a plurality of pixels divided into a plurality of pixel groups, and the light signal received by each pixel conversion is a first pulse width modulation signal. The convolution computation circuit 221, according to the first pulse width modulation signal of each pixel in each pixel group, controls the turn-on time of the corresponding weighted current, and accumulates the weighted currents of a plurality of pixels into the integrated current. The value of the weighted current corresponds to the weight of a node in the convolutional layer in the trained convolutional neural network. The max pooling computation circuit 223 converts the integrated current into a second pulse width modulation signal and compares it with the second pulse width modulation signal of the adjacent pixel group, thereby outputting the second pulse width modulation signal with a larger value. The fully-connected computation circuit 225 quantizes the second pulse width modulation signal of the pixel groups into one of a plurality of quantization values according to the weight of a node in a fully-connected layer corresponding to each pixel group in the trained convolutional neural network, and accumulates the quantization values of all pixel groups into the feature value and compares it with the feature threshold to obtain a classification result. The number of pixels in each pixel group is determined according to the number of kernels used by the trained convolutional neural network, for example, 3×3, but is not limited thereto. The embodiment will describe the pixel array 21, the convolution computation circuit 221, the max pooling computation circuit 223, and the fully-connected computation circuit 224 in the image sensor 20 in detail below.

Figure 4:
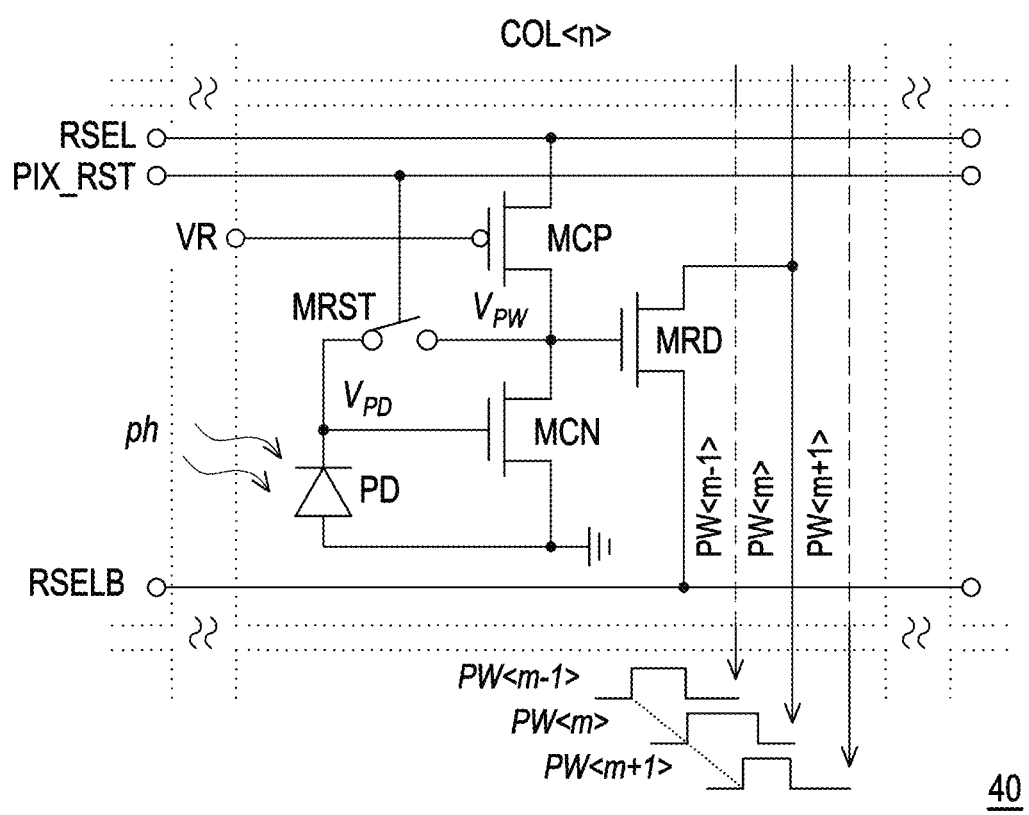
FIG. 4 illustrates a circuit diagram of a pixel circuit according to an embodiment of the disclosure.

In an embodiment, the circuit of each pixel in the pixel array 21 includes, for example, a light sensor, an in-pixel comparator, a pixel reset switch, and an output selection switch. For example, FIG. 4 illustrates a circuit diagram of a pixel circuit according to an embodiment of the disclosure. Referring to FIG. 4, a pixel circuit 40 includes a light sensor PD, an in-pixel comparator (including switches MCP and MCN), an output selection switch MRD, and a pixel reset switch MRST. The light sensor is, for example, a photodiode. The switch MCP has a control terminal coupled to a reference voltage VR, and a first terminal coupled to a selecting signal line RSEL. The switch MCN has a first terminal coupled to the second terminal of the switch MCP, a second terminal coupled to the first terminal and the ground terminal of the light sensor PD, and a control terminal coupled to the second terminal of the light sensor PD. In the exposure stage, the value of a voltage $V_{PD}$ is a light current ph sensed by the photodiode PD starting to discharge from an initial voltage $V_{PD}$<RST>. After a period of exposure time, the value of the voltage $V_{PD}$ is the readout value selected by the in-pixel comparator based on the ramping reference voltage by using pulse width modulation conversion. The pixel reset switch MRST has a control terminal coupled to a reset signal line PIX_RST, the first terminal coupled to the second terminal of the light sensor PD, and the second terminal coupled to the second terminal of the switch MCP and the first terminal of the switch MCN, and is configured to selectively turn on the first terminal and the second terminal according to the reset signal of the reset signal line PIX_RST. The output selection switch MRD has a control terminal coupled to the second terminal of the switch MCP and the first terminal of the switch MCN, a first terminal coupled to a selecting signal line RSELB, and a second terminal coupled to the signal output line, and is configured to output a pulse width modulation signal PW<m> converted from the light signal. For three pixels in the row direction in the same column (for example, Col<n>), this embodiment may output three pulse width modulation signals PW<m−1>, PW<m>, and PW<m+1> at a time.

In an embodiment, the convolution computation circuit 221 includes a plurality of column convolution computation circuits corresponding to a plurality of columns of pixels in the pixel group. Taking the pixel group with a size of 3×3 pixels as an example, the convolution computation circuit 221 includes 3 column convolution computation circuits respectively corresponding to the 3 columns of pixels. Each column convolution computation circuit includes a plurality of sign bit logics, a plurality of switch-current integration (SCI) units, and an integration circuit.

The symbol bit logics respectively receive the first pulse width modulation signal of the pixel, and gate the first pulse width modulation signal according to the sign bit signal and the zero bit signal in the weight-related signal corresponding to each pixel.

Specifically, when the image sensor 20 starts operating, for example, 9 weights of a 3×3 kernel represented by a 5 bit signal (including $W_1$, $W_2$, $W_4$, SIGN, and ZERO) are loaded into the register within 9 clock signal cycles. During the period of operation of switch-current integration, the image sensor 20 uses the 3 bit signal ($W_1$, $W_2$, and $W_4$) to control the digital-to-analog converter (DAC) shared by the array at the correct current level, and uses the other 2 bits (SIGN and ZERO) for the sign bit logic. The sign bit logic, for example, outputs the signal of the gated first pulse width modulation signal when the zero bit signal (ZERO) is 1, and outputs the signal of the gated first pulse width modulation signal when the zero bit signal is 0. In addition, the sign bit logic, for example, when the sign bit signal (SIGN) is 1, outputs a signal gated as add (ADD), and when the sign bit signal is 0, outputs a signal gated as subtract (SUB).

The switch-current integration units respectively receive the first pulse width modulation signal gated through the sign bit logic, and control the turn-on time of the weighted current corresponding to the pixel according to the weight bit signal in the weight-related signal corresponding to each pixel.

The integration circuit includes at least one integrated capacitance to accumulate the weighted currents output by all switch-current integration units to generate an integration voltage.

In an embodiment, each switch-current integration unit includes a positive switch and a negative switch. When the sign bit signal in the received weight-related signal is positive, the switch-current integration unit powers off the negative switch and powers on the positive switch to output the weighted current through the positive switch; and when the sign bit signal in the received weight-related signal is negative, the switch-current integration unit powers off the positive switch and powers on the negative switch to output the weighted current through the negative switch. In addition, the integration circuit as described above includes a first side circuit and a second side circuit, and the first side circuit includes a first integrated capacitance for accumulating the weighted currents output by all positive switches to generate a positive integrated voltage, and the second side circuit includes a second integrated capacitance for accumulating the weighted currents output by all negative switches to generate a negative integrated voltage.

Figure 5:
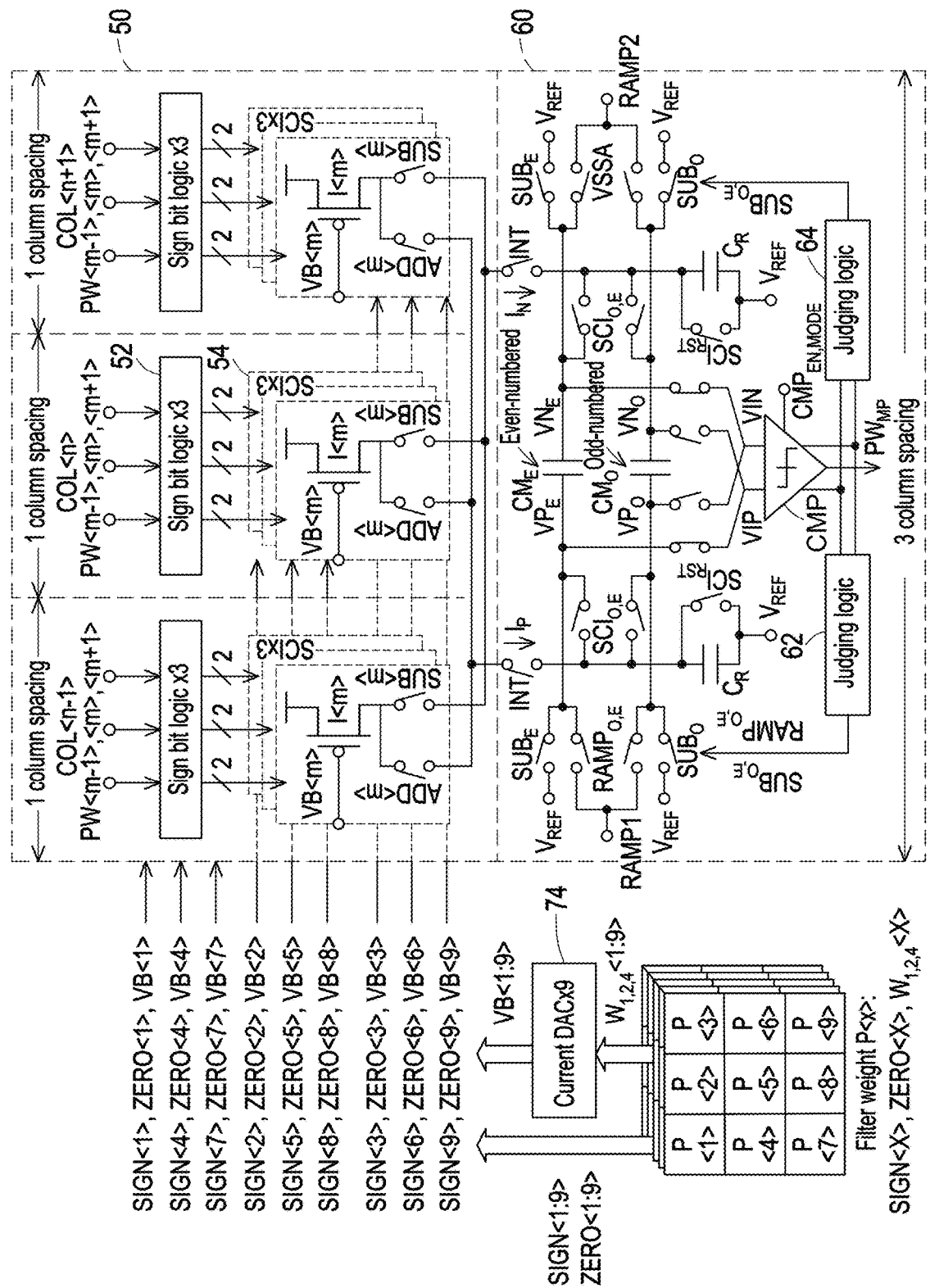
FIG. 5 illustrates a circuit diagram of a convolution computation circuit and a max pooling computation circuit according to an embodiment of the disclosure.

For example, FIG. 5 illustrates a circuit diagram of a convolution computation circuit and a max pooling computation circuit according to an embodiment of the disclosure. Referring to FIG. 5, this embodiment includes a convolution computation circuit 50 and a max pooling computation circuit 60. A filter weight P<x> corresponding to each pixel in the 3×3 pixel group is shown on the left. From top left to bottom right is P<1> to P<9> in sequence, which may be divided into a zero bit signal ZERO<1:9>, a sign bit signal SIGN<1:9> and a weight bit signal $W_{1,2,4}$<1:9>, where the zero bit signal ZERO<1:9> and the sign bit signal SIGN<1:9> are respectively input to the sign bit logics in three column convolution computation circuits COL<n-1> to COL<n+1> of a right convolution computation circuit 52; and the weight bit signal $W_{1,2,4}$<1:9> is converted to a voltage signal VB<1:9> through 9 groups of current digital-to-analog converter (IDAC) 74, and is respectively input to the switch-current integration (SCI) unit in three column convolution computation circuits COL<n-1> to COL<n+1> of the right convolution computation circuit 52.

Figure 6:
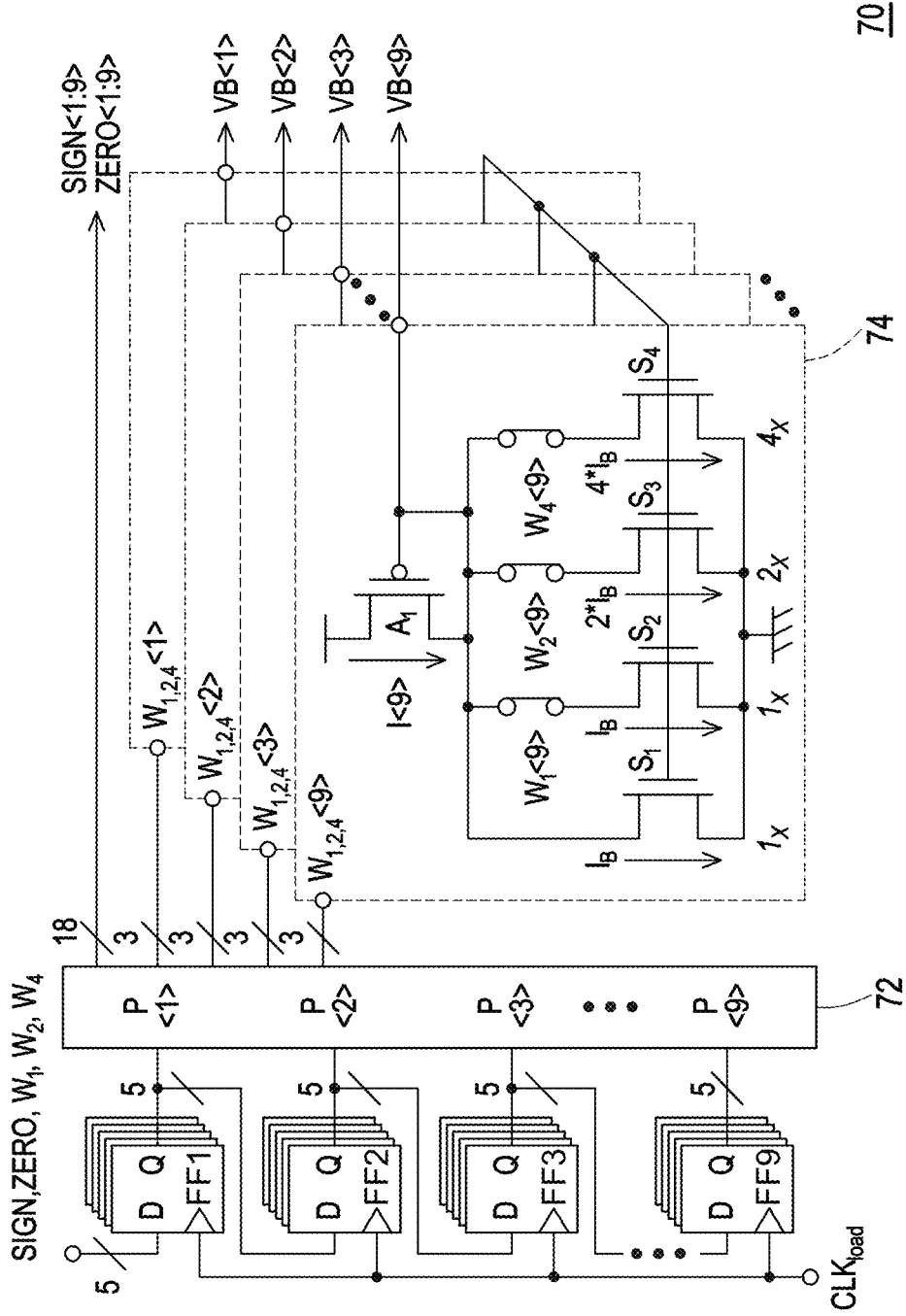
FIG. 6 illustrates a circuit diagram of a weight generation circuit according to an embodiment of the disclosure.

Specifically, FIG. 6 illustrates a circuit diagram of a weight generation circuit according to an embodiment of the disclosure. Referring to FIG. 6, a weight generation circuit 70 of this embodiment includes nine 5-bit flip-flops FF1 to FF9, a buffer 72, and a plurality of current digital-to-analog converters (IDAC) 74.

The flip-flops FF1 to FF9 are connected in series in sequence, and the input terminal of the first flip-flop FF1 receives the weight-related signals (including SIGN, ZERO, $W_1$, $W_2$, and $W_4$), and the input terminals of the other flip-flops FF1 to FF8 are coupled to the output terminal of the previous flip-flop connected in series. The clock signal input terminals of the flip-flops FF1 to FF9 receive a clock signal $CLK_{Load}$.

A buffer 72 temporarily stores the zero bit signal ZERO<1:9>, the sign bit signal SIGN<1:9>, and the weight bit signal $W_{1,2,4}$<1:9> in the weight-related signals output by the flip-flops FF1 to FF9. 9 groups of current digital-to-analog converter (IDAC) 74 respectively receive the weight bit element signal $W_{1,2,4}$<1:9> of the pixel temporarily stored in the buffer 72. Each current digital-to-analog converter includes a plurality of weight switches $S_1$ to $S_4$ and a summing switch A1. The weight switches $S_1$ to $S_4$ have a first terminal coupled to each other and a second terminal coupled to each other and grounded, and the area of the weight switches $S_1$ to $S_4$ has a preset ratio (for example, 1:1:2:4 shown in FIG. 6), so that when the weight switches $S_1$ to $S_4$ are powered on from the control terminal according to the weight bit signal $W_{1,2,4}$<1:9>, the weight switches $S_1$ to $S_4$ turn on the currents (for example, $I_B$, $I_B$, $2*I_B$, $4*I_B$ as shown in FIG. 6) having the preset ratio. The summing switch A1 has a first terminal that is coupled to the voltage supply and a second terminal and a control terminal that are coupled to the first terminal of the weight switches $S_1$ to $S_4$, and the voltage VB<1:9> at the control terminal corresponds to the sum of the weighted currents ($I_B$, $I_B$, $2*I_B$, $4*I_B$) flowing through the weight switches $S_1$ to $S_4$.

When the convolution computation circuit of this embodiment performs convoluted computation, it powers on three columns (<m-1>, <m>, <m+1>) at the same time to select a 3×3 pixel sub-array to output 9 pixel values of the adjacent columns (<n-1>, <n>, <n+1>). The output of these 9 pixels is multiplied by 9 weighted currents and integrated in an integrated capacitance CME to complete the convoluted (MAC) computation.

Taking the convolution computation circuit of the <n> column as an example, when a sign bit signal SIGN<m>=1 or 0, three signal related pulses (PW<m>) from three selected columns are gated as an add (ADD)<m>/subtract (SUB<m>) signal according to the positive/negative weight by 3 groups of sign bit logic 52. At the same time, in a switch-current integration unit 54, a weighted current $I_P$<m>/$I_N$<m> biased by the voltage VB<m> is powered on, and is accumulated into an integrated current $I_P$<n>/$I_N$<n> of the column COL<n> on the left and right sides of the integrated capacitance $CM_E$.

The accumulated charge on the integrated capacitance CME is the decided according to an add (ADD<m>)/subtract (SUB<m>) signal and weighted current of the time domain. By powering on the column convolution computation circuits of two adjacent columns (COL<n-1> and COL<n+1>) at the same time, a positive weight-related current ($I_P$<n-1>, $I_P$<n>, $I_P$<n+1>) and a negative weight-related current ($I_N$<n-1>, $I_N$<n>, $I_N$<n+1>) are added up to $I_P$ and $I_N$, respectively, and are respectively integrated on both sides of the integrated capacitance $CM_E$, so as to realize the MAC computation of the 3×3 pixel sub-array and the 3×3 kernel.

After the MAC computation using SCI, integration voltages $V_P$ and $V_N$ on both sides of the integrated capacitance CME may respectively represent the positive and negative results of the analog convolution. In an embodiment, the max pooling computation circuit uses a voltage comparator to compare the positive integrated voltage and the negative integrated voltage to output the convolution result, and uses a judging logic (JG) to check the signal polarity (POL) of the convolution result, that is, to check whether the positive integrated voltage $V_P$ is greater than the negative integrated voltage $V_N$. When the convolution result of the judging logic is that the positive integrated voltage is greater than the negative integrated voltage, the integration circuit may be controlled to save the voltage difference between the positive integrated voltage and the negative integrated voltage, and when the convolution result is that the positive integrated voltage is less than the negative integrated voltage, the integration circuit may be controlled to reset the positive integrated voltage and the negative integrated voltage.

In addition, the max pooling computation circuit further includes a first ramp circuit coupled to the first side circuit of the integration circuit and a second ramp circuit coupled to the second side circuit of the integration circuit.

For example, when the signal polarity=1 (that is, $V_P > V_N$), the negative integrated voltage $V_N$ is controlled by a signal SUB to be connected to an integration starting voltage $V_{REF}$, and the positive integrated voltage $V_P$ is shifted downward by $V_N$ voltage at the same time to complete the positive-negative integrated voltage subtraction action ($V_P - V_N$). On the other hand, in order to realize the excitation function (ReLU) computation, if the input is negative (that is, $V_P - V_N < 0$), the positive and negative integrated voltages $V_N$ and $V_P$ are controlled by the signal SUB to be connected to the integration starting voltage $V_{REF}$ to reset the positive-negative integrated voltage result.

By using the above architecture, the ReLU function may be implemented simply by quantizing only the positive convolution results according to the signal polarity and ignoring the negative convolution results.

Figure 7:
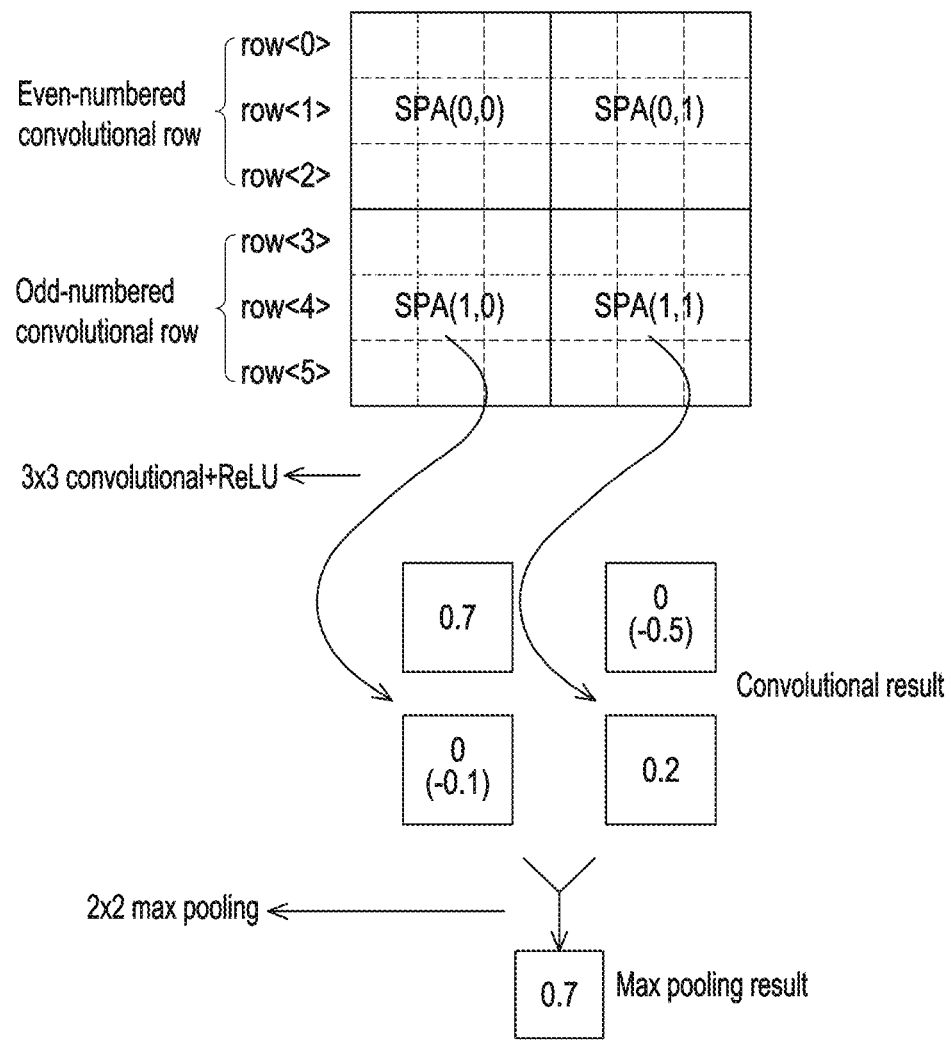
FIG. 7 illustrates a schematic diagram of max pooling computation according to an embodiment of the disclosure.

For example, FIG. 7 illustrates a schematic diagram of max pooling operation according to an embodiment of the disclosure. FIGS. 8A to 8F illustrate circuit diagrams of a max pooling computation circuit and a corresponding timing chart according to an embodiment of the disclosure. Referring to FIG. 7, this embodiment shows the process of implementing convolution and max pooling computations on the adjacent 4 pixel groups SPA(0,0), SPA(0,1), SPA(10, 0), and SPA(1,1) by using 3×3 pixels as the pixel group.

Figure 8A:
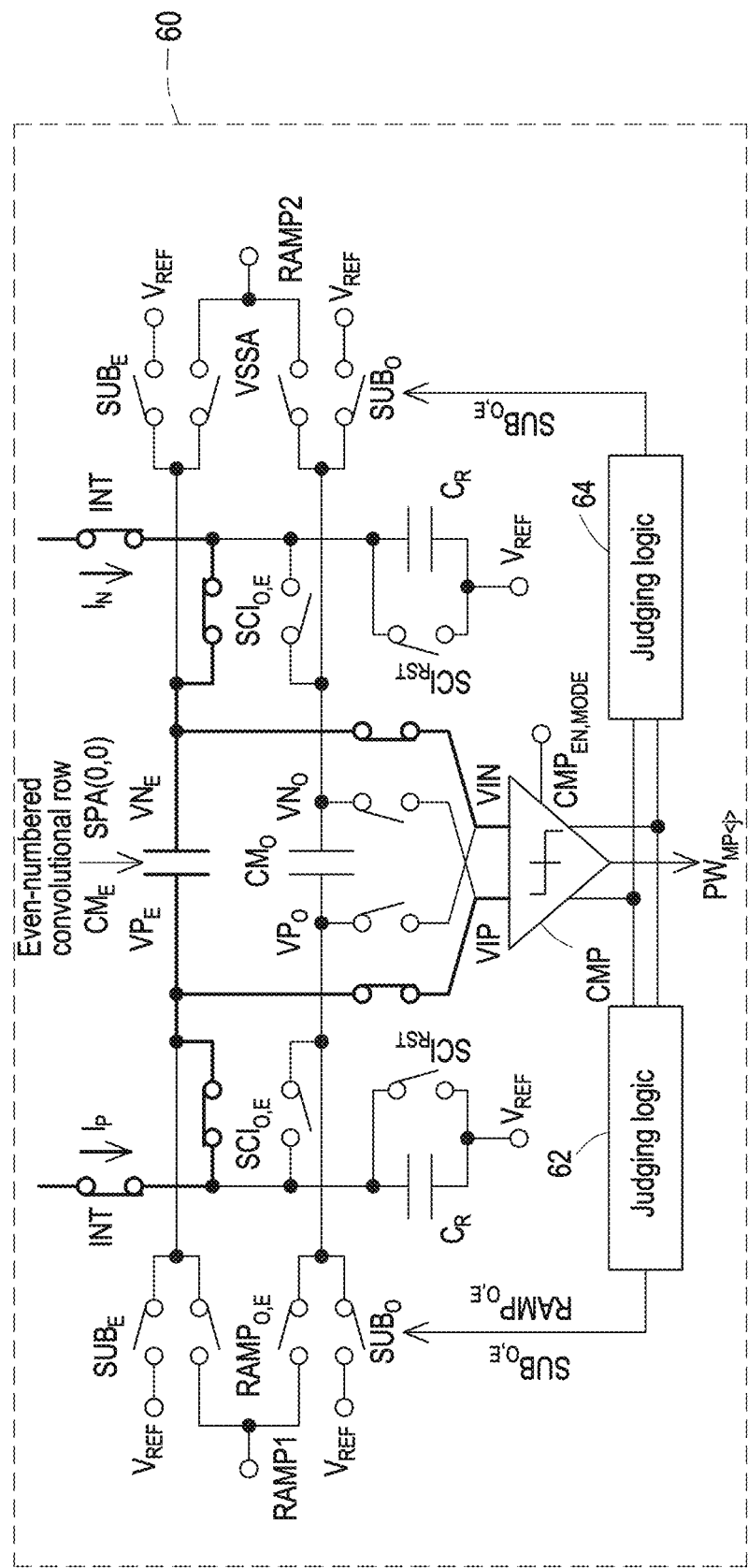
FIGS. 8A to 8F illustrate circuit diagrams of a max pooling computation circuit and a corresponding timing chart according to an embodiment of the disclosure.
Figure 8B:
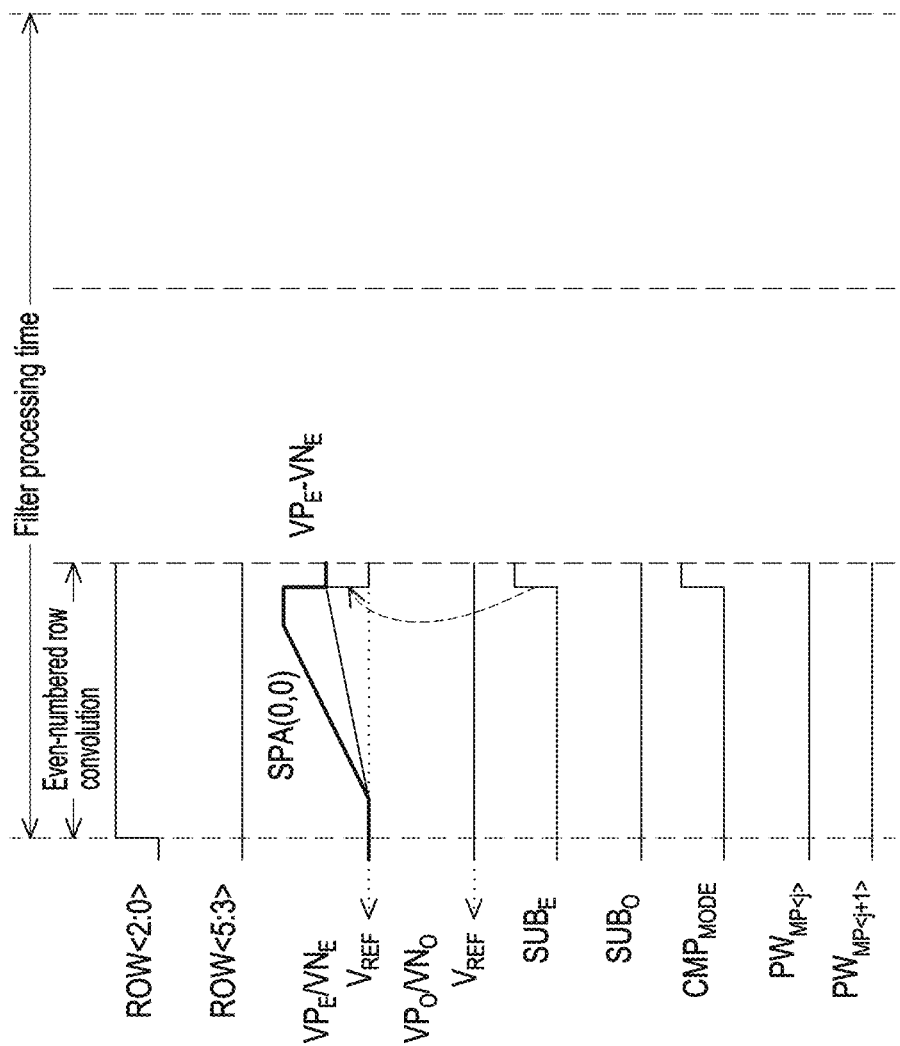

First, for a pixel group SPA(0,0) of an even-numbered row (row 0), referring to FIG. 7 and FIG. 8A, after computation by the convolution computation circuit 50 in FIG. 5, the output integrated current is accumulated to a capacitance $C_R$ through a switch INT, and by turning on the switch $SCI_E$, positive integrated voltages $VP_E$ and $VN_E$ are accumulated on both sides of the central capacitance $CM_E$. The positive and negative integrated voltages $VP_E$ and $VN_E$ are respectively input to input terminals VIP and VIN of a comparator CMP, and the comparator CMP judges that $VP_E > VN_E$. Referring to FIG. 8B, at this time, judging logics 62 and 64 output a signal $SUB_E$ according to the judgment result of the comparator CMP, so as to control the switch $SUB_E$ connected to the reference voltage $V_{REF}$ to turn on, and to save a complete convolutional computation result on the left side of the central capacitance $CM_E$.

Figure 8C:
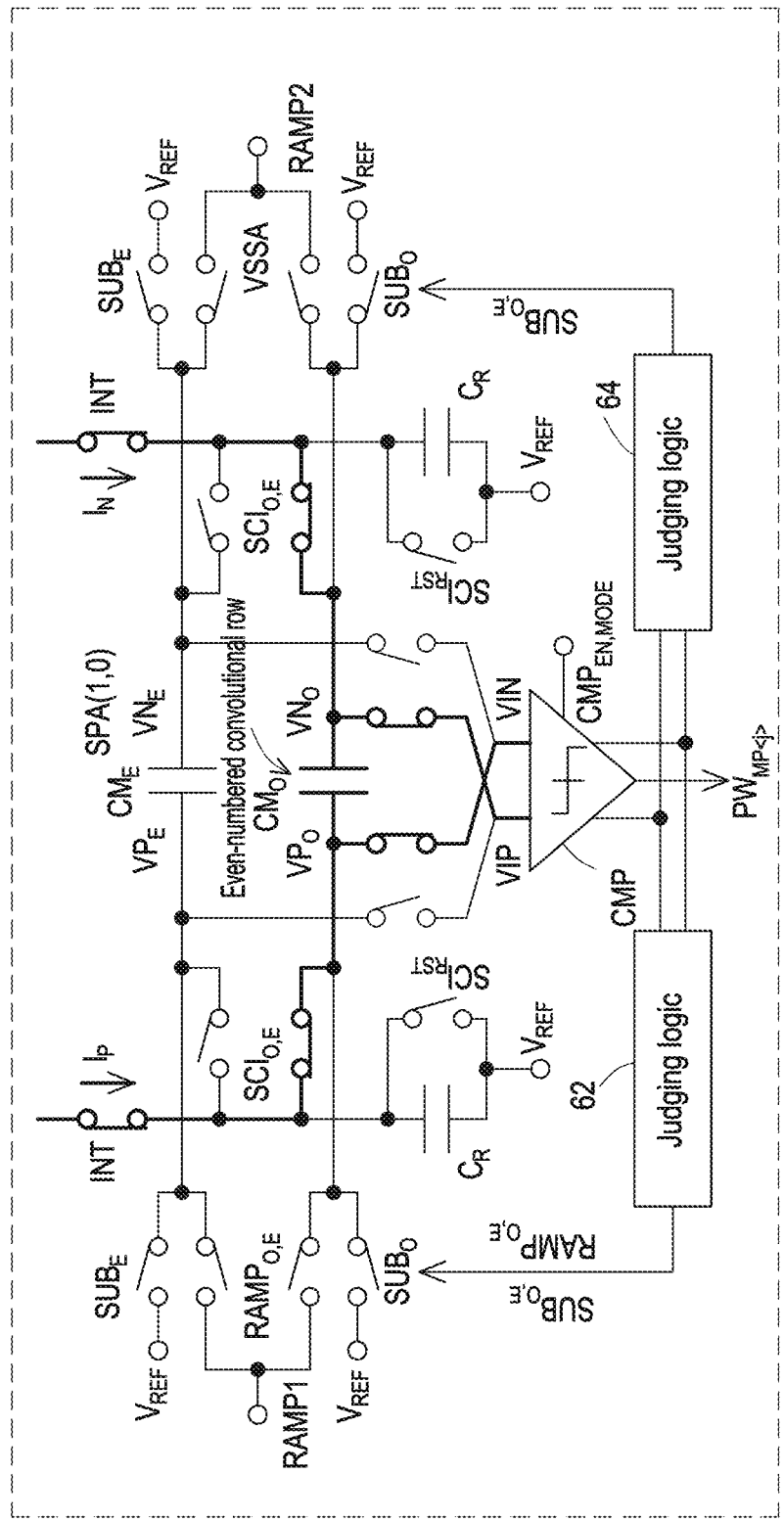
Figure 8D:
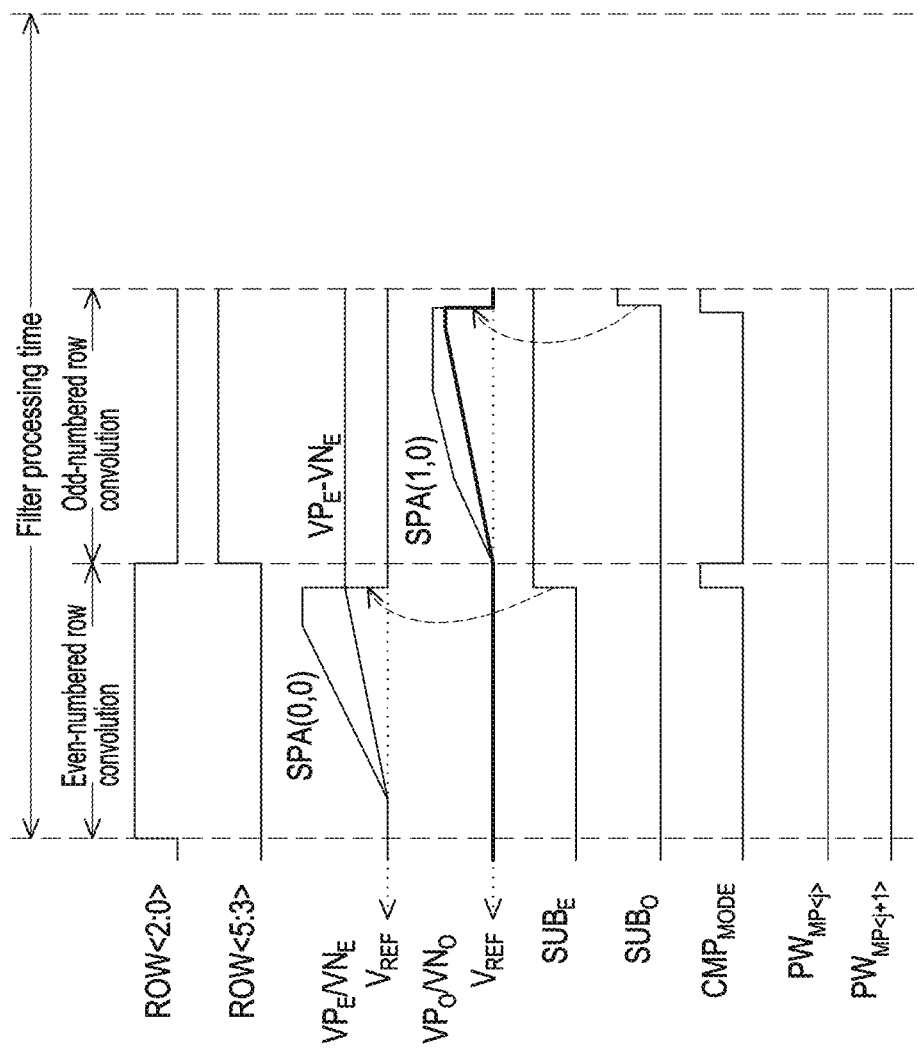

Next, for a pixel group SPA(1,0) of an odd-numbered row (row+1), referring to FIG. 7 and FIG. 8C, after computation by the convolution computation circuit 50 in FIG. 5, the output integrated current is accumulated to the capacitance $C_R$ through switch INT, and by turning on a switch $SCI_O$, positive integrated voltages VPO and VNO are accumulated on both sides of a central capacitance $CM_O$. The positive and negative integrated voltages VPO and VNO are respectively input to the input terminals VIP and VIN of the comparator CMP, and the comparator CMP judges that $VP_E < VN_E$. Referring to FIG. 8D, at this time, the judging logics 62 and 64 output a signal $SUB_O$ according to the judgment result of the comparator CMP, so as to control the switch $SUB_O$ connected to both sides of the reference voltage $V_{REF}$ to turn on, and to reset the positive negative integrated voltages VPO and VNO to the integration starting point at the same time, which means that the result of the complete convolutional computation may be regarded as 0.

Figure 8E:
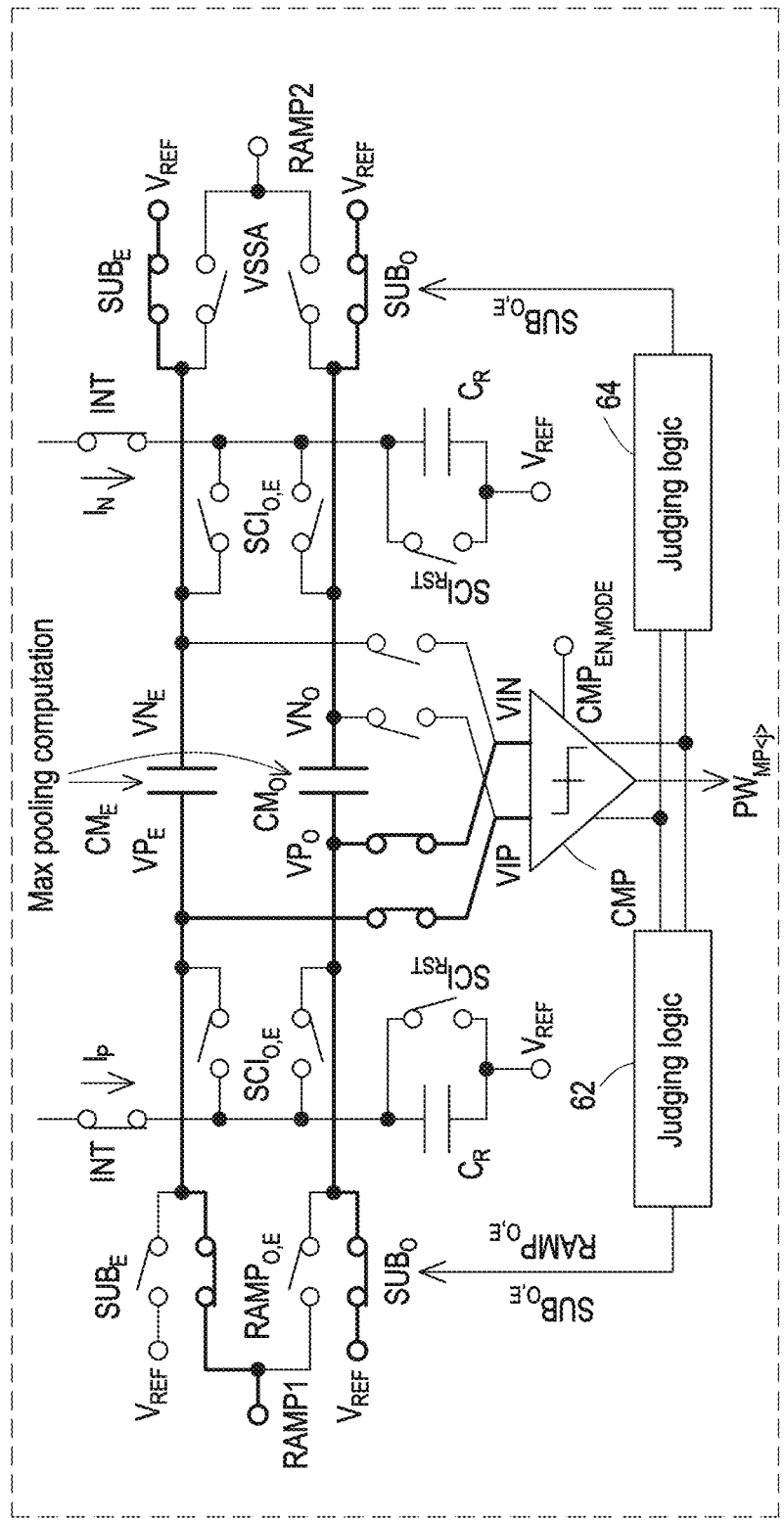

Next, the max pooling computation is performed. Referring to FIG. 7 and FIG. 8E, in this mode, the switch INT is disconnected to stop receiving the integrated current, and the judging logics 62, 64 output signals $SUB_E$ and $RAMP_E$ according to the judgment result of the comparator CMP, so that the central capacitance $CM_E$ controls the right switch $SUB_E$ connected to the reference voltage $V_{REF}$ to turn on, and controls the left switch $RAMP_E$ connected to a ramp generator RAMP1 to turn on, so that the integration voltage $VP_E$ accumulated on the left side of the central capacitance $CM_E$ is input to the terminal VIP of the comparator CMP. On the other hand, the judging logics 62 and 64 further output the signals $SUB_O$ and $RAMP_O$ according to the judgment result of the comparator CMP, so that the central capacitance $CM_O$ controls the switch $SUB_O$ connected to the left and right sides of the reference voltage $V_{REF}$ to turn on, and to reset the integration voltage VPO accumulated on the left side of the central capacitance $CM_O$ and input the same to the input terminal VIN of the comparator CMP.

Figure 8F:
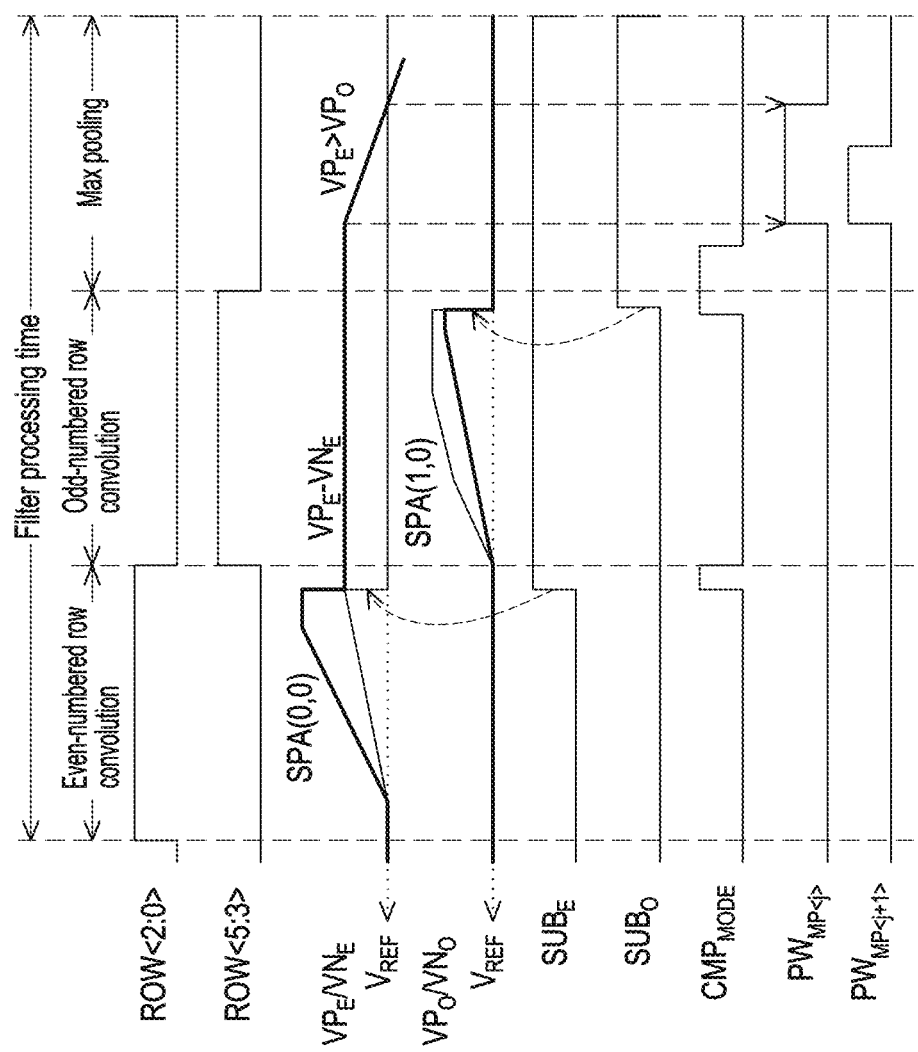

Referring to FIG. 7 and FIG. 8F, the comparator CMP compares the voltage of the input terminals VIP and VIN, and outputs a pulse width modulation signal $PW_{MP}<j>$. The result of convoluted and ReLU computations performed on the pixel group SPA(0,0) of the even-numbered row (row 0) is 0.7, and, the result of convoluted and ReLU computations performed on the pixel group SPA(1,0) of the odd-numbered row (row+1) is 0. Therefore, a pulse width modulation signal $PW_{MP}<j>$ output by the comparator CMP Is 0.7. On the other hand, the result of convoluted and ReLU computations of a pixel group SPA(0,1) adjacent to the even-numbered row (row 0) in the row direction is 0, and the result of convoluted and ReLU computations performed on the pixel group SPA(1,1) adjacent to the odd-numbered row (row 1) in the row direction is 0.2. Therefore, the pulse width modulation signal $PW_{MP}<j+1>$ output by the comparator CMP is 0.2. Among the two pulse width modulation signals $PW_{MP}<j>$ and $PW_{MP}<j+1>$, the pulse width modulation signal with the longer pulse width may be output through the logic OR gate to derive the max pooling result (0.7).

Specifically, the comparison circuit, for example, includes the logic OR gate, and is used to take the second pulse width modulation signal with the longest pulse width among the second pulse width modulation signals of adjacent pixel groups in the row direction, and output the same to the classification circuit.

In an embodiment, the classification circuit includes a plurality of column classification circuits, an up-down counter, and a feature comparator. Each column classification circuit corresponds to a plurality of columns of pixels in two adjacent pixel groups in the row direction in the pixel group, and includes a logic AND gate, a quantization counter, and a decoder. The logic AND gate inputs the zero bit signal in the weight-related signal of a node in a fully-connected layer and the second pulse width modulation signal and the clock signal generation output by the comparison circuit, and outputs the quantized clock signal that is non-zero and is located in the pulse of the second pulse width modulation signal. The quantization counter is used to calculate the number of pulses in the quantized clock signal. The decoder is used to decode the number of pulses into a quantization value. The up-down counter accumulates the quantization values output by all column classification circuits into the feature value based on the sign bit signal in the weight-related signal of a node in a fully-connected layer. The feature value comparator compares the calculated feature value with the feature threshold to obtain a classification result.

Figure 9A:
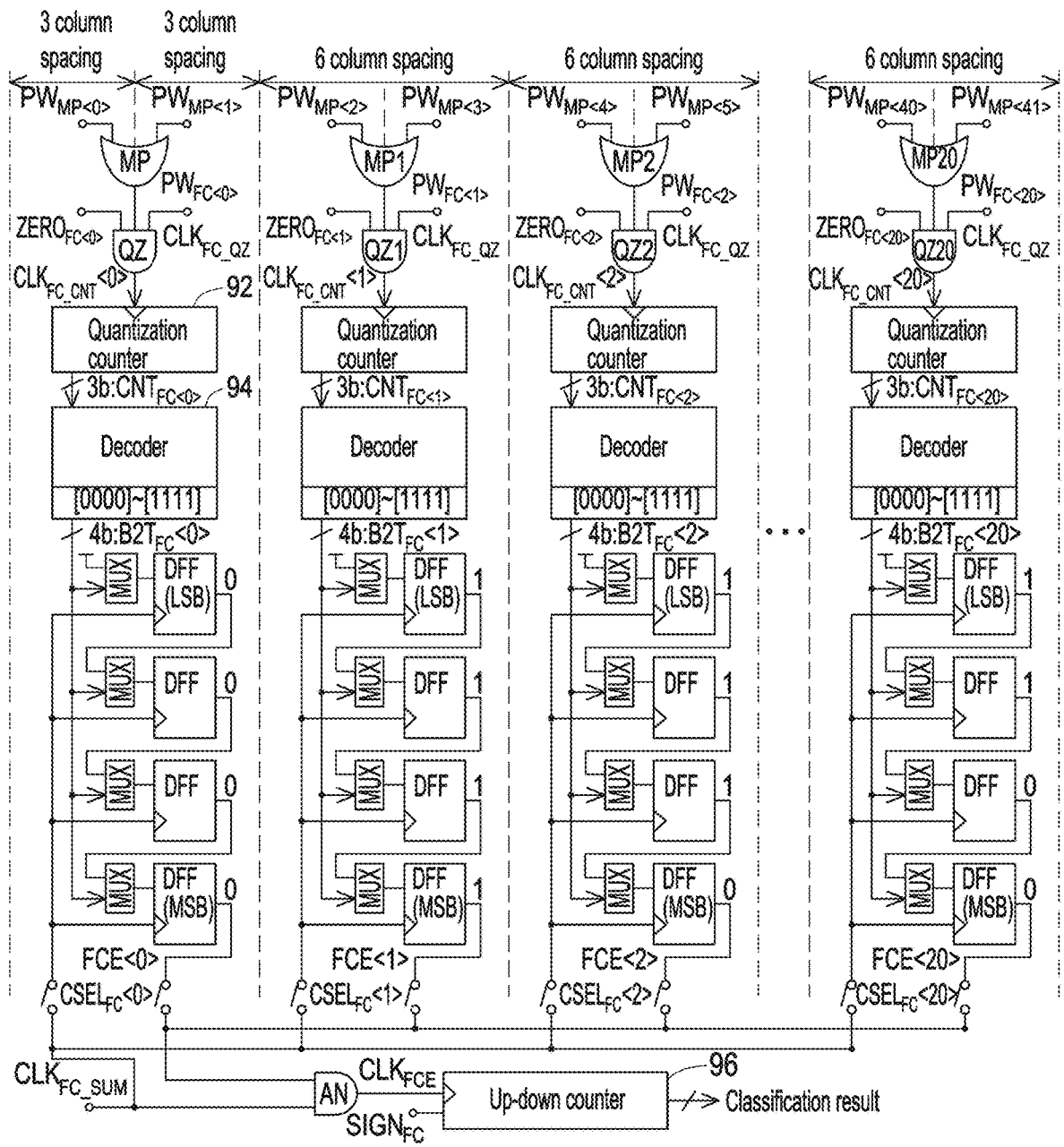
FIGS. 9A and 9B respectively illustrate a circuit diagram of a comparison circuit and a classification circuit and a corresponding timing chart according to an embodiment of the disclosure.
Figure 9B:
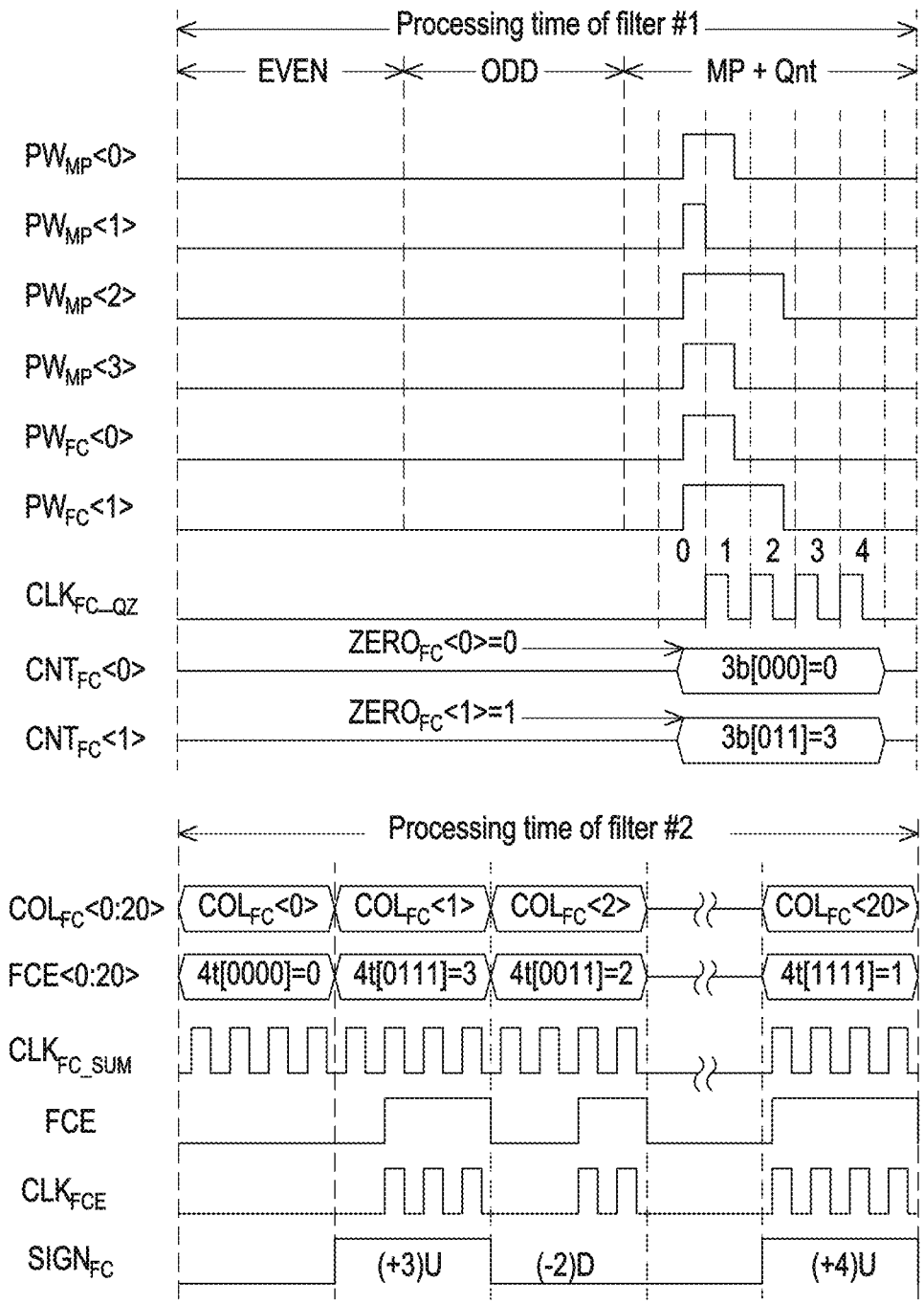

For example, FIGS. 9A and 9B respectively illustrate a circuit diagram of a comparison circuit and a classification circuit and a timing chart according to an embodiment of the disclosure. Referring to FIG. 9A, the comparison circuit of this embodiment includes logic OR gates MP0 to MP20. Taking the logic OR gate MP0 as an example, the logic OR gate MP0 may receive second pulse width modulation signals $PW_{MP}<0>$ and $PW_{MP}<1>$ of the adjacent pixel group in the row direction. Referring to FIG. 9A and FIG. 9B, during the processing time of a filter #1, the logic OR gate MP0 takes, for example, the pulse width modulation signal with the longest pulse width among the pulse width modulation signals $PW_{MP}<0>$ and $PW_{MP}<1>$ and outputs the same as a pulse width modulation signal PWFC<0>. Similarly, the logic OR gate MP1 takes, for example, the pulse width modulation signal with the longest pulse width among pulse width modulation signals $PW_{MP}<2>$ and $PW_{MP}<3>$ and outputs the same as a pulse width modulation signal PWFC<1>.

On the other hand, the classification circuit of this embodiment includes a plurality of column classification circuits, and each column classification circuit corresponds to a plurality of columns of pixels in two adjacent pixel groups in the row direction. Each column classification circuit has 6 columns of spacing and includes a logic AND gate, a quantization counter, and a decoder.

Taking the first column classification circuit as an example, a logic AND gate QZ0 receives a zero bit signal ZEROFC<0> in the weight-related signal of a node in a fully-connected layer, a pulse width modulation signal PWFC<0> output by the logic OR gate MP0 of the max pooling computation circuit and the input of a clock signal generation $CLK_{FC\_QZ}$, and outputs a quantized clock signal $CLK_{FC\_CNT}<0>$ that is non-zero and is located in the pulse width of a pulse width modulation signal PWFC<0> to a quantization counter 92.

In an embodiment, the quantization counter 92 includes, for example, a 3 bit counter and a latch, which uses 3 bits to record the number of pulses. In a first column classification circuit, the quantization counter 92 calculates a number of pulses $CNT_{FC}<0>$ in the quantized clock signal $CLK_{FC\_CNT}<0>$. Referring to FIG. 9A and FIG. 9B, in this embodiment, the zero bit signal ZEROFC<0> received by the logic AND gate QZ0 is equal to 0; therefore, the output quantized clock signal $CLK_{FC\_CNT}<0>$ is 0, the number of pulses $CNT_{FC}<0>$ calculated by the quantization counter 92 is 3-bit [000]. On the other hand, the zero bit signal ZEROFC<0> received by a logic AND gate QZ1 is equal to 1; therefore, and a quantized clock signal $CLK_{FC\_CNT}<1>$ (including 3 pulses) that is non-zero and is located in the pulse width of the pulse width modulation signal PWFC<1> is output; therefore, the number of pulses $CNT_{FC}<0>$ calculated by the quantization counter 92 is 3-bit [011].

Next, the decoder 94 decodes the number of pulses $CNT_{FC}<0>$ calculated by the quantization counter 92 into a quantization value $B2T_{FC}<0>$. In an embodiment, the decoder 94 is, for example, a binary-to-thermometer decoder for transcoding a 3-bit number of pulses into a 4-bit quantization value. The 4 bits of this quantization value are input to 4 flip-flop DFFs connected in series via a multiplexer MUX, and are input to a logic AND gate AN in sequence through the switch (controlled by a selecting signal $CSEL_{FC}$) switching to be converted by a clock signal generation $CLK_{FC\_SUM}$ to a pulse signal $CLK_{FCE}$, and finally sent to an up-down counter UDC for counting. In this embodiment, the up-down counter UDC is, for example, a 15-bit counter that may count up and down, but is not limited thereto.

In addition to receiving the quantization value (converted to the pulse signal $CLK_{FCE}$) sequentially output by the classification circuit, the up-down counter UDC further receives a sign bit signal $SIGN_{FC}$ in the weight-related signal of a node in a fully-connected layer to accumulate the quantization values output by the all column classification circuits into the feature value according to the positive and negative values of the sign bit signal $SIGN_{FC}$. If the sign bit signal $SIGN_{FC}$ is positive, the up-down counter UDC uses the quantization value to count up the accumulated feature value, and if the sign bit signal $SIGN_{FC}$ is negative, the up-down counter UDC uses the quantization value to count down the accumulated feature value. Finally, the feature value of the integrated quantization values output by all column classification circuits is derived.

Referring to FIG. 9A and FIG. 9B, during the processing time of a filter #2, the output switch of the flip-flop DFF is turned on by a column fully-connected selecting signal $COL_{FC}<0:20>$ to output a fully-connected element signal FCE<0:20>, and then, through the logic AND gate AN, the clock signal generation $CLK_{FC\_SUM}$ is converted to the pulse signal $CLK_{FCE}$ and is sent to the up-down counter UDC to count up and down according to the sign bit signal $SIGN_{FC}$. In the pulse signal $CLK_{FCE}$, the clock signal corresponding to a second column classification circuit includes 3 pulses and the sign bit signal $SIGN_{FC}$ is positive, so the up-down counter UDC counts up the feature value by 3 (that is, +3); the clock signal corresponding to a third column classification circuit includes 2 pulses and the sign bit signal $SIGN_{FC}$ is negative, so the up-down counter UDC counts down the feature value by 2 (that is, −2). By analogy, the up-down counter UDC may finally output the feature value integrated with the quantization valued output by all the column classification circuits.

In summary, the image sensor integrated with the convolutional neural network computation of the embodiment of the disclosure uses pulse width modulation pixels as the photosensitive element, executes the computations required by the complete convolutional neural network in the vertical parallel circuit, and directly outputs the face or feature discrimination result, thereby solving the problem of frame rate drop, power consumption increase, and slower discrimination speed caused by data computations that need to be transmitted between chips.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. An image sensor integrated with convolutional neural network computation, comprising:
   a pixel array, comprising a plurality of pixels divided into a plurality of pixel groups, wherein a light signal received by conversion of each of the pixels is a first pulse width modulation (PWM) signal;
   a convolution computation circuit, controlling a turn-on time of a corresponding weighted current according to a first pulse width modulation signal of each of the pixels in each of the pixel groups, accumulating the weighted currents of the plurality of pixels into an integrated current, wherein a value of the weighted current corresponds to a weight of a node in a convolutional layer in a trained convolutional neural network;

a comparison circuit, converting the integrated current into a second pulse width modulation signal, comparing the second pulse width modulation signal with the second pulse width modulation signal of the adjacent pixel group in a row direction, outputting the second pulse width modulation signal with a larger value; and a classification circuit, quantizing the second pulse width modulation signal of the pixel group into one of a plurality of quantization values according to a weight of a node in a fully-connected layer corresponding to each of the pixel groups in the trained convolutional neural network, accumulating the quantization value of all the pixel groups into a feature value and comparing the feature value with a feature threshold to obtain a classification result.

2. The image sensor according to claim 1, wherein each of the pixels comprises:

a light sensor;

an in-pixel comparator, comprising a first switch and a second switch, wherein
the first switch has a control terminal coupled to a reference voltage and a first terminal coupled to a selecting signal line,
the second switch has a first terminal coupled to a second terminal of the first switch, a second terminal coupled to a first terminal and a ground terminal of the light sensor, and a control terminal coupled to a second terminal of the light sensor;

a pixel reset switch, having a control terminal coupled to a reset signal line, a first terminal coupled to the second terminal of the light sensor, and a second terminal coupled to the second terminal of the first switch and the first terminal of the second switch, configured to selectively turn on the first terminal and the second terminal according to a reset signal of the reset signal line; and an output selection switch, having a control terminal coupled to the second terminal of the first switch and the first terminal of the second switch, a first terminal coupled to a second selecting signal line, and a second terminal coupled to a signal output line, configured to output the first pulse width modulation signal converted from the light signal.

3. The image sensor according to claim 1, wherein the convolution computation circuit comprises a plurality of column convolution computation circuits corresponding to a plurality of columns of pixels of the pixel group, and each of the column convolution computation circuits comprises:

a plurality of sign bit logics, respectively receiving the first pulse width modulation signal of the pixel, gating the first pulse width modulation signal according to a sign bit signal and a zero bit signal in a weight-related signal corresponding to each of the pixels;

a plurality of switch-current integration (SCI) units, respectively receiving the first pulse width modulation signal gated by the sign bit logic, controlling the turn-on time of the weighted current corresponding to the pixel according to a weight bit signal in the weight-related signal corresponding to each of the pixels; and an integration circuit, comprising at least one integrated capacitance, accumulating the weighted currents output by all switch-current integration units to generate an integration voltage.

4. The image sensor according to claim 3, wherein the convolution computation circuit further comprises:

a weight generation circuit, comprising:
a plurality of flip-flops connected in series in sequence, wherein an input terminal of a first flip-flop among the flip-flops receives the weight-related signal, and an input terminal of another flip-flop among the flip-flops is coupled to an output terminal of the previous flip-flop connected in series;
a buffer, temporarily storing a plurality of zero bit signals, a plurality of sign bit signals, and a plurality of weight bit signals of the weight-related signal output by the flip-flops; and
a plurality of current digital-to-analog converters (IDAC), respectively receiving the weight bit signal of the pixel temporarily stored in the buffer, wherein each of the current digital-to-analog converters comprises:
a plurality of weight switches, having a first terminal coupled to each other and a second terminal coupled to each other and grounded, wherein an area of the weight switch has a preset ratio, so that when the weight switch is powered on from a control terminal according to the weight bit signal, the weight switch turns on a current having the preset ratio; and
a summing switch, having a first terminal coupled to a supply voltage, and a second terminal and a control terminal coupled to the first terminal of the weight switch, wherein a voltage of the control terminal corresponds to a sum of the weighted currents flowing through the weight switch.

5. The image sensor according to claim 3, wherein
each of the switch-current integration units further comprises a positive switch and a negative switch, wherein
when the sign bit signal in the received weight-related signal is a positive value, the negative switch is powered off and the positive switch is powered on to output the weighted current via the positive switch, and
when the sign bit signal in the received weight-related signal is a negative value, the positive switch is powered off and the negative switch is powered on to output the weighted current via the negative switch; and
the integration circuit comprises a first side circuit and a second side circuit, wherein
the first side circuit comprises a first integrated capacitance for accumulating the weighted currents output by all the positive switches to generate a positive integrated voltage, and
the second side circuit comprises a second integrated capacitance for accumulating the weighted currents output by all the negative switches to generate a negative integrated voltage.

6. The image sensor according to claim 5, wherein the comparison circuit comprises:

a voltage comparator, comparing the positive integrated voltage with the negative integrated voltage to output a convolution result; and a judging logic, checking a signal polarity of the convolution result, when the convolution result is that the positive integrated voltage is greater than the negative integrated voltage, controlling the integration circuit to save a voltage difference between the positive integrated voltage and the negative integrated voltage, when the convolution result is that the positive integrated voltage is less than the negative integrated voltage, controlling the integration circuit to reset the positive integrated voltage and the negative integration.

7. The image sensor according to claim 6, wherein the comparison circuit further comprises:
   a first ramp circuit, coupled to the first side circuit of the integration circuit; and
   a second ramp circuit, coupled to the second side circuit of the integration circuit, wherein
   when the judging logic determines that the convolution result is that the positive integrated voltage is greater than the negative integrated voltage, the judging logic resets the negative integrated voltage by using a reference voltage, and controls the first ramp circuit to equate a downward displacement value of the positive integrated voltage with a voltage of the negative integrated voltage, so as to save the voltage difference between the positive integrated voltage and the negative integrated voltage, and
   when the judging logic determines that the convolution result is that the positive integrated voltage is less than the negative integrated voltage, the judging logic disables the first ramp circuit and the second ramp circuit, and resets the positive integrated voltage and the negative integrated voltage by using the reference voltage.

8. The image sensor according to claim 1, wherein the comparison circuit comprises:
   a logic OR gate, taking and outputting the second pulse width modulation signal with a longest pulse width among the second pulse width modulation signals of the adjacent pixel groups in the row direction.

9. The image sensor according to claim 1, wherein the classification circuit comprises:
   a plurality of column classification circuits, wherein each of the column classification circuits corresponds to a plurality of columns of pixels in two adjacent pixel groups in the row direction among the pixel groups, wherein the column classification circuit comprises:
      a logic AND gate, inputting a zero bit signal in a weight-related signal of the node in the fully-connected layer, the second pulse width modulation signal and a clock signal output by the comparison circuit, outputting a quantized clock signal that is non-zero and is located in a pulse width of the second pulse width modulation signal;
      a quantization counter, calculating a number of pulses in the quantized clock signal; and
      a decoder, decoding the number of pulses into a quantization value;
   an up-down counter, accumulating the quantization values output by all the column classification circuits into the feature value according to a sign bit signal in a weight-related signal of the node in the fully-connected layer; and
   a feature value comparator, comparing the feature value with the feature threshold to derive the classification result.

10. The image sensor according to claim 1, wherein a number of pixels in each of the pixel groups is determined according to a size of a kernel of the trained convolutional neural network.

* * * * *